United States Patent [19]

Robinson

[11] Patent Number: 5,076,320
[45] Date of Patent: Dec. 31, 1991

[54] FUEL RAIL MOUNTED FUEL PRESSURE REGULATOR

[75] Inventor: Barry S. Robinson, Newport News, Va.

[73] Assignee: Siemens Automotive L.P., Auburn Hills, Mich.

[21] Appl. No.: 600,468

[22] Filed: Oct. 19, 1990

[51] Int. Cl.$^5$ .............................................. G05D 16/08
[52] U.S. Cl. .................................. 137/454.2; 123/463; 137/510
[58] Field of Search .................. 137/454.2, 454.5, 510; 123/456, 463, 467

[56] References Cited

U.S. PATENT DOCUMENTS

| | | | |
|---|---|---|---|
| 2,700,983 | 2/1955 | Bryant | 251/900 |
| 4,231,347 | 11/1980 | Ohumi et al. | 137/510 X |
| 4,741,315 | 5/1988 | Fehrenbach et al. | 123/467 X |
| 4,825,835 | 5/1989 | Deweerdt | 123/467 X |
| 4,883,088 | 11/1989 | Herbst | 137/510 |

*Primary Examiner*—Stephen M. Hepperle
*Attorney, Agent, or Firm*—George L. Boller; Russel C. Wells

[57] ABSTRACT

A fuel pressure regulator valve comprises a housing constructed from plural metal stampings and containing a diaphragm assembly which divides the housing into a control chamber and a fuel chamber. The housing is shaped to contain integral grooves for O-ring seals so that the O-rings stay on the valve when it is removed from its mounting socket in a fuel rail. Two of the stampings partially define the fuel chamber and are joined by means of a crimp formed in one. The other of the two has a hardness greater than that of the one to facilitate its press-fit engagement with the valve seat tube. The crimp is below the upper O-ring seal so that the crimp provides an entirely satisfactory joint. Each O-ring is located within its groove with the aid of a spacer also disposed in the groove.

21 Claims, 1 Drawing Sheet

5,076,320

FUEL RAIL MOUNTED FUEL PRESSURE REGULATOR

FIELD OF THE INVENTION

This invention relates generally to fuel injection systems for internal combustion engines, and in particular to a fuel pressure regulator valve that integrally mounts on a fuel rail.

BACKGROUND AND SUMMARY OF THE INVENTION

The integral mounting of a fuel pressure regulator valve on a fuel rail typically necessitates the inclusion of a sealing means between the valve and the rail so that fuel that is present in the rail does not leak from the rail via potential leak paths between the valve and the fuel rail socket that receives the valve. Typical sealing means comprises one or more O-ring seals, which are usually made of a fuel-resistant elastomer.

In one known design the O-rings may remain in the socket when the pressure regulator valve is removed. Therefore whenever service requires that the valve be removed from the fuel rail, the possibility exists that a negligent person may either loose the O-ring seals or improperly re-install them.

In another known design, the O-rings will remain on the valve when it is removed from the socket, but the design possesses a relatively expensive construction for the regulator valve housing and requires fuel pressure testing. The housing comprises three parts, namely a stamping and two screw machined parts which are assembled with the use of both brazing and crimping. The grooves that are required for the O-ring seals are in one of the screw machined parts and the brazed joint which joins the stamping and one of the screw machined parts and bounds the fuel chamber is outside the zone of sealing that is provided by the O-ring seals. Because of this construction, pressure testing of the brazed joint is essential to ensure that it does not leak.

The present invention relates to a new and unique construction for a fuel pressure regulator valve mounted integrally on a fuel rail whereby the O-ring seals will remain on the valve when the valve is removed from the fuel rail while the O-ring retention on the valve housing does not require the use of screw-machined parts to provide the grooves for the O-ring seals. Moreover, brazing of a stamping to a screw-machined part is avoided, and fuel pressure testing of such a joint is likewise avoided.

Accordingly, a fuel pressure regulator valve that embodies the inventive principles offers significant advantages over the known valves mentioned above. Additional advantages, along with further features, will be gathered from the ensuing description which is accompanied by drawings. The drawings disclose a presently preferred embodiment of the invention according to the best mode contemplated at the present time for carrying out the invention.

DESCRIPTION OF THE PREFERRED EMBODIMENT

Figure 1:
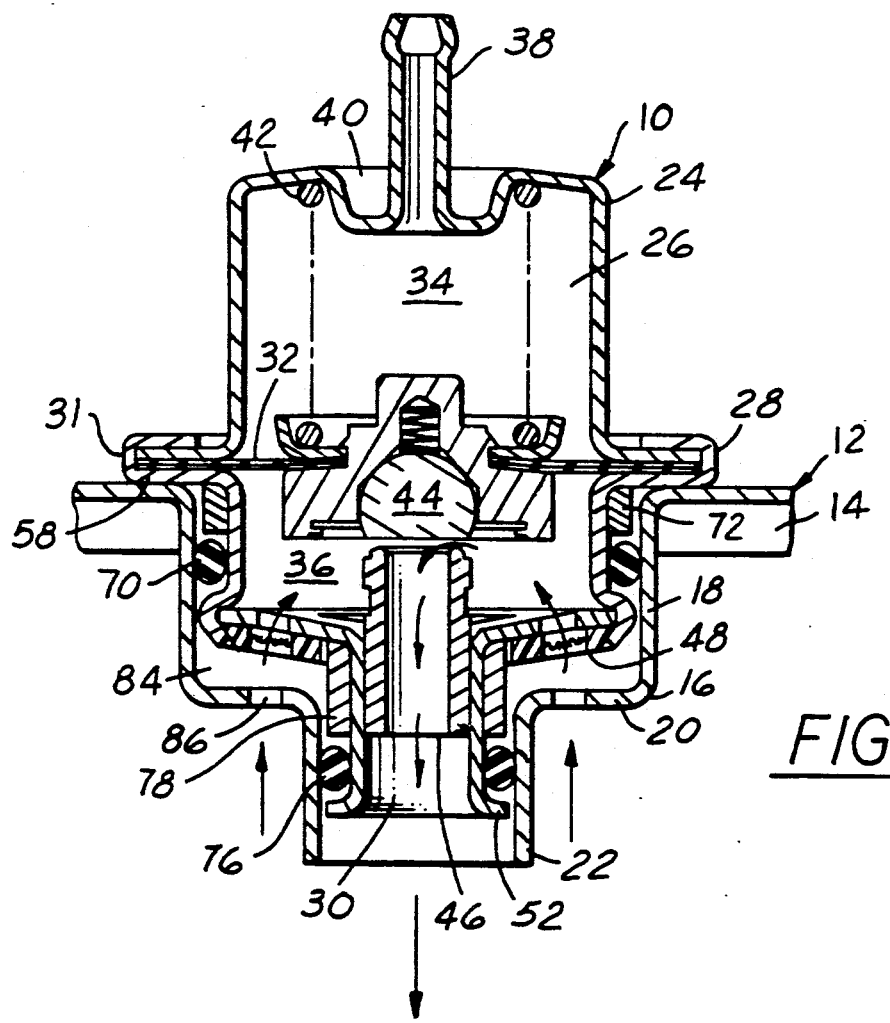
FIG. 1 is a longitudinal cross section through a fuel pressure regulator valve mounted in a fuel rail socket.

FIG. 1 shows a fuel pressure regulator valve 10 mounted integrally on a fuel rail 12, the latter being only partially shown in the drawing. Fuel rail 12 comprises a stamped metal part 14 in which is formed a circular cylindrical socket 16 shaped to receive valve 10. Socket 16 comprises in succession from the top, a larger diameter side wall portion 18, a shoulder 20, and a smaller diameter side wall portion 22.

Valve 10 comprises a housing 24 which has a circular cylindrical shape. Housing 24 comprises three stamped metal parts that are joined in assembly. In succession from the top in FIG. 1 these three parts are: an upper metal stamping 26, a middle metal stamping 28, and a lower metal stamping 30. A movable diaphragm assembly 32 divides housing 24 into a control chamber 34 and a fuel chamber 36. Control chamber 34 is cooperatively defined by part 28 and the diaphragm assembly; fuel chamber 36, by the diaphragm assembly and parts 28 and 30. The radially outer margin of the diaphragm assembly is captured by flange structure 31 that extends around the outside of housing 24 and that also serves to join parts 26 and 28 in assembly. This flange structure comprises the lower portion of part 26 and the upper portion of part 28 being shaped for sandwiching the diaphragm's outer margin while the terminus of the upper portion of part 28 is wrapped over and around the lower portion of part 26. This flange structure is conventional in the manufacture of certain fuel pressure regulator valves.

The construction of part 24 is conventional in that its top wall comprises a central nipple 38 surrounded by a spring seat 40. A helical spring 42 is disposed in control chamber 34 between spring seat 40 and a central region of diaphragm assembly 32 to urge the diaphragm assembly away from chamber 34 and toward chamber 36.

Details of diaphragm assembly 32 are also conventional, and reference may be had to commonly assigned U.S. Pat. No. 4,928,729 (Hornby) for a description. Suffice it to say for the moment that the diaphragm assembly centrally carries a swively-mounted valve element in the form of a truncated sphere 44.

Figure 2:
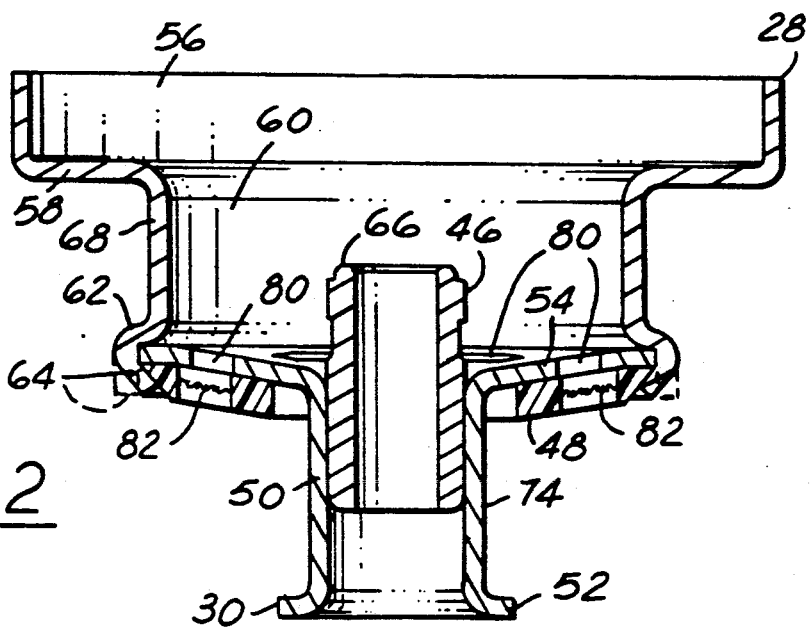
FIG. 2 is an enlarged view similar to FIG. 1, but presenting only a sub-assembly during a stage of the process for fabricating the fuel pressure regulator valve.

Stampings 28 and 30 cooperate with a tube 46 and an annular filter element 48 to form a sub-assembly which is shown by itself in FIG. 2 at one stage of the process of fabricating valve 10. This stage is before parts 26 and 28 are joined together to sandwich the outer margin of the diaphragm assembly.

Part 30 is shaped to comprise a circular cylindrical sleeve 50 with a rolled flanged 52 at its lower end and a wide flange 54 at its upper end. Part 28 is shaped to comprise from the top in FIG. 2: an axial portion 56, a radial portion 58, an axial portion 60, a radial portion 62, and an axial portion 64. Filter element 48 fits over sleeve 50 and against flange 54. Prior to association of part 28 with part 30, the entirety of axial portion 64 is straight (broken line position of FIG. 2) and essentially parallel with axial portion 60. This allows flange 54 to be telescopically disposed within part 28 with its radially outer margin against radial portion 62 during the step of joining parts 28 and 30 together. It also allows the radially outer margin of filter element 48 to be disposed within part 28.

With the parts 28, 30, and 48 having been so associated, axial portion 64 is deformed from the broken line position to the solid line position in FIG. 2 whereby the portions 62 and 64 are formed into a crimp that engages the outer margins of filter element 48 and flange 54 and thus unites these three parts in a sub-assembly ready to be assembled with part 26 and diaphragm assembly 32 in the manner previously described. The material hardness of part 28 is chosen to allow for the proper formation of the crimp, and for example, steel having a Rockwell B scale hardness between 45 and 65 is quite suitable.

Tube 46 and part 30 are in assembled relationship by virtue of sleeve 50 having a press-fit around the outside of the tube. As should be apparent from the drawings, tube 46 is a machined metal. A proper press-fit of the sleeve on the tube is attained by an appropriate material hardness of part 30, for example steel having a Rockwell B scale hardness of at least 85. Tube 46 is disposed such that its upper end 66 is juxtaposed to the truncated surface of sphere 44. End 66 is shaped to form a valve seat against which the truncated sphere surface can be disposed.

The two part construction which consists of parts 28 and 30 is especially advantageous. One advantage is that it provides both suitable material hardness for the press-fit engagement of tube 46 with sleeve 50 and suitable material hardness for the crimp joint that holds the parts 28 and 30 in assembly, the latter hardness being less than the former. Another advantage is that the crimp also functions to define a portion of a radially outwardly open groove 68 for an O-ring seal 70.

The remainder of groove 68 is defined by radial and axial portions 58 and 60. Whenever the axial extent of groove 68 is considerably greater than the axial extent of the O-ring seal, as is illustrated by the drawing, an O-ring spacer 72 can be disposed to aid in locating the O-ring seal in the groove. The drawing shows the spacer disposed between the O-ring seal and radial portion 58. The spacer need not be circumferentially continuous, and for example a split ring of suitable plastic could be used. Typically the O-ring spacer would be expanded to pass over the crimp and lodge in the groove. Likewise, the selection of a suitable elastomeric material for the O-ring seal would enable it, even though it is circumferentially continuous, to be stretched sufficiently to pass over the crimp and then contract onto the tube within the groove.

Flanges 52 and 54 cooperate with sleeve 50 in forming a further radially outwardly open groove 74. A further O-ring seal 76 and a further O-ring spacer 78 occupy groove 74 with spacer 78 being disposed between seal 76 and flange 54.

The fuel inlet port for the valve comprises several through-holes 80 in flange 54. Filter element 48 is constructed to support a screen 82 in covering relation to these through-holes so that any particulate material in the fuel which reaches the screen and is larger than the screen's mesh will be prevented from entering the fuel chamber. The fuel outlet port for the valve is the open lower end of sleeve 50.

Integrated mounting of valve 10 on fuel rail 12 is accomplished by aligning the main longitudinal axis of the valve with that of socket 16, passing the lower end of the valve through the open upper end of the socket, and increasingly inserting the valve into the socket until flange structure 31 abuts the fuel rail around the top of the socket. In the fully installed condition presented in FIG. 1, the two O-ring seals bound a space 84 that is cooperatively defined by respective portions of the valve housing and the socket. Through-holes 80 are in fluid communication with this space via screen 82. Pressurized fuel within the rail is communicated to space 84 via through-holes 86 in shoulder portion 20. Thus pressurized fuel can pass from the rail to space 84 and thence to the valve's fuel chamber 36.

The valve functions in a conventional fuel pressure regulating fashion. Spring 42 tends to force sphere 44 against seat 66 to close tube 46 to flow. A pressure in fuel chamber 36 that is sufficient to overcome the spring force, as modified by whatever engine manifold vacuum is communicated to control chamber 34 via nipple 38, will urge the diaphragm assembly upwardly and begin to unseat the valve element so that fuel can pass from chamber 36 through tube 46 and out the valve outlet port. The extent to which the valve opens is a function of the relative pressures in the two chambers and the spring force. The valve opening is such that the flow restriction which it presents will cause the upstream pressure to be regulated.

The flow that passes from the valve outlet port passes through the open lower end of socket 16 to a fuel return. Although not expressly illustrated in the drawing, the fuel rail is constructed such that the pressurized fuel zone of the rail is sealed from the return flow.

Typically, the integrally mounted valve is mechanically captured in the socket by a retainer, which is not shown in the drawing. Should it ever become necessary to remove the valve from the socket, the retainer is first removed, and then the valve can be removed. When the valve is removed, the O-rings remain on the valve.

The crimping of parts 28 and 30 provides a sufficient integrity to the housing wall and forms a joint that does not require any additional sealing provisions. Note that in the installation of FIG. 1 the crimp is below O-ring 70.

Thus it can be now appreciated that the invention provides meaningful improvements in a fuel pressure regulator valve and its mounting on a fuel rail. While a preferred embodiment of the invention has been illustrated and described, it is also to be appreciated that principles of the invention may be practiced in other equivalent constructions.

What is claimed is:

1. In a fuel pressure regulator valve comprising a housing containing a movable diaphragm assembly that divides the housing into two chambers, one chamber being a fuel chamber that is cooperatively defined by said diaphragm assembly and a first portion of said housing, and the other chamber being a control chamber that is cooperatively defined by said diaphragm assembly and a second portion of said housing, a fuel inlet port via which fuel flows to said fuel chamber, a fuel outlet port via which fuel flows from said fuel chamber, a tube that forms a portion of a flow path extending from said fuel inlet port through said fuel chamber to said fuel outlet port and that has at one end thereof a valve seat disposed in said fuel chamber, and a valve element that is carried by said diaphragm assembly for coaction with said valve seat to perform a pressure regulating function on fuel occupying said fuel chamber by selectively restricting flow passing to said fuel outlet port from said fuel inlet port, the improvement which comprises said first portion of said housing comprising a first stamped metal housing part and a second stamped metal housing part which are joined in assembly, said first stamped metal housing part having a given hardness and comprising an integral sleeve having a press-fit on said tube, said second stamped metal housing part having a hardness which is less than that of said first stamped metal housing part and comprising an integral crimp that joins said first stamped metal part in assembly with said second stamped metal part, and wherein said inlet port and said outlet port are both disposed in said first stamped metal housing part.

2. In a fuel pressure regulator valve comprising a housing containing a movable diaphragm assembly that divides the housing into two chambers, one chamber being a fuel chamber that is cooperatively defined by said diaphragm assembly and a first portion of said housing, and the other chamber being a control chamber that is cooperatively defined by said diaphragm assembly and a second portion of said housing, a fuel inlet port via which fuel flows to said fuel chamber, a fuel outlet port via which fuel flows from said fuel chamber, a tube that forms a portion of a flow path extending from said fuel inlet port through said fuel chamber to said fuel outlet port and that has at one end thereof a valve seat disposed in said fuel chamber, and a valve element that is carried by said diaphragm assembly for coaction with said valve seat to perform a pressure regulating function on fuel occupying said fuel chamber by selectively restricting flow passing to said fuel outlet port from said fuel inlet port, the improvement which comprises said first portion of said housing comprising a first stamped metal housing part and a second stamped metal housing part which are joined in assembly, said first stamped metal housing part having a given hardness and comprising an integral sleeve having a press-fit on said tube, said second stamped metal housing part having a hardness which is less than that of said first stamped metal housing part and comprising an integral crimp that joins said first stamped metal part in assembly with said second stamped metal part, and wherein said housing and said tube share a common longitudinal axis, said housing comprises flange structure that is directed radially outwardly relative to said axis, that extends circumferentially around said housing exterior of said chambers, and that captures a circumferential margin of said diaphragm assembly, and further including an O-ring seal disposed on said second stamped metal housing part exterior of said fuel chamber and occupying a radially outwardly open groove that is cooperatively defined by said flange structure, said crimp, and that portion of said second stamped metal part that is between said flange structure and said crimp.

3. The improvement set forth in claim 2 further including an O-ring spacer disposed in said groove to aid in locating said O-ring seal in said groove.

4. The improvement set forth in claim 3 wherein said O-ring spacer is disposed between said O-ring seal and said flange structure.

5. The improvement set forth in claim 2 including a further O-ring seal disposed on said first stamped metal housing part around the exterior of said sleeve.

6. The improvement set forth in claim 5 wherein said first stamped metal part is shaped to include a further radially outwardly open groove, said further O-ring seal being disposed in said further groove.

7. The improvement set forth in claim 6 wherein said further groove comprises two flanges each of which is at a respective end of said sleeve, and including a further O-ring spacer disposed in said further groove to aid in locating said further O-ring seal in said further groove.

8. The improvement set forth in claim 7 wherein one of said two flanges comprises a radially outer margin that is engaged by said crimp to join said two stamped metal parts in assembly and said further O-ring spacer is disposed between said one flange and said further O-ring seal.

9. The improvement set forth in claim 8 wherein said fuel inlet port comprises through-aperture means in said one flange and further including an annular filter element disposed against said one flange in covering relation to said through-aperture means.

10. The improvement set forth in claim 9 wherein said annular filter element is disposed exterior of said fuel chamber and comprises a radially outer margin that is engaged by said crimp.

11. In a fuel pressure regulator valve comprising a housing containing a movable diaphragm assembly that divides the housing into two chambers, one chamber being a fuel chamber that is cooperatively defined by said diaphragm assembly and a first portion of said housing, and the other chamber being a control chamber that is cooperatively defined by said diaphragm assembly and a second portion of said housing, a fuel inlet port via which fuel flows to said fuel chamber, a fuel outlet port via which fuel flows from said fuel chamber, a flow path that extends from said fuel inlet port through said fuel chamber to said fuel outlet port, a valve seat that is disposed in said fuel chamber, and a valve element that is carried by said diaphragm assembly for coaction with said valve seat to perform a pressure regulating function on fuel occupying said fuel chamber by selectively restricting flow passing to said fuel outlet port from said fuel inlet port, the improvement which comprises said first portion of said housing comprising stamped metal shaped to have two grooves that are radially outwardly open relative to an axis of the valve, two O-ring seals each of which is disposed in a respective one of said two grooves, one of said fuel ports being disposed in said first portion of said housing between said two O-ring seals, and the other of said fuel ports being disposed at a location in said valve other than between said two O-ring seals, and wherein said stamped metal comprises a first metal housing part and a second metal housing part which are joined in assembly by means of a crimp, said crimp defining a portion of one of said grooves.

12. The improvement set forth in claim 11 wherein said housing comprises flange structure that is directed radially outwardly relative to said axis, that extends circumferentially around said housing exterior of said chambers, and that captures a circumferential margin of said diaphragm assembly, said flange structure defining another portion of said one groove.

13. The improvement set forth in claim 12 further including an O-ring spacer disposed on said housing in said one groove to aid in locating within said one groove the one of said two O-ring seals that is disposed in said one groove.

14. The improvement set forth in claim 13 wherein said O-ring spacer is disposed between said flange structure and said one O-ring seal.

15. The improvement set forth in claim 13 including a further O-ring spacer disposed in the other of said grooves to aid in locating within said other groove the other of said two O-ring seals.

16. In a fuel rail having a socket within which a fuel pressure regulator valve is disposed, from which the fuel pressure regulator valve is removable, and into which the fuel pressure regulator valve is re-insertable, said fuel pressure regulator valve comprising a housing containing a movable diaphragm assembly that divides the housing into two chambers, one chamber being a fuel chamber that is cooperatively defined by said diaphragm assembly and a first portion of said housing, and the other chamber being a control chamber that is cooperatively defined by said diaphragm assembly and a second portion of said housing, a fuel inlet port via which fuel flows to said fuel chamber, a fuel outlet port via which fuel flows from said fuel chamber, a flow path that extends from said fuel inlet through said fuel chamber to said fuel outlet, a valve seat that is disposed in said fuel chamber, and a valve element that is carried by said diaphragm assembly for coaction with said valve seat to perform a pressure regulating function on fuel occupying said fuel chamber by selectively restricting flow passing to said fuel outlet from said fuel inlet, the improvement which comprises said first portion of said housing being stamped metal shaped to have two grooves that are radially outwardly open relative to an axis of the valve, two O-ring seals each of which is disposed in a respective one of said two grooves such that said O-ring seals remain with the fuel pressure regulator valve upon removal thereof from said socket, one of said fuel ports being disposed in that portion of said first portion of said housing between said two O-ring seals, and the other of said fuel ports being disposed in said valve at a location other than between said two O-ring seals, said socket comprising a wall portion which in cooperation which said housing defines a space that is in fluid communication with said one of said fuel ports and is sealed by said O-ring seals sealing between said wall portion and said housing, and aperture means in said socket providing fluid communication of said inlet port to a fuel source and fluid communication of said outlet port to a fuel drain, and wherein said first portion of said housing comprises a first stamped metal part and a second stamped metal part that are joined together, one of said stamped metal parts being shaped to comprise one of said grooves, and the other of said stamped metal parts being shaped to comprise the other of said grooves.

17. The improvement set forth in claim 16 wherein said socket wall portion comprises a shoulder between a larger diameter portion of said socket wall portion and a smaller diameter portion of said socket wall portion, one of said O-ring seals sealing against said larger diameter portion and the other of said O-ring seals sealing against said smaller diameter portion.

18. The improvement set forth in claim 17 wherein said aperture means comprises at least one aperture in said shoulder that is in fluid communication with said space.

19. The improvement set forth in claim 18 wherein said socket is a metal stamping.

20. The improvement set forth in claim 19 wherein said metal stamping is a portion of a stamped metal member which forms part of said fuel rail.

21. The improvement set forth in claim 16 further including an O-ring spacer disposed in one of said grooves to aid in locating in said one groove the one of said O-ring seals that is disposed in said one groove.

* * * * *